(No Model.)
T. MAGUIRE.
GAS COCK.
No. 385,719. Patented July 10, 1888.
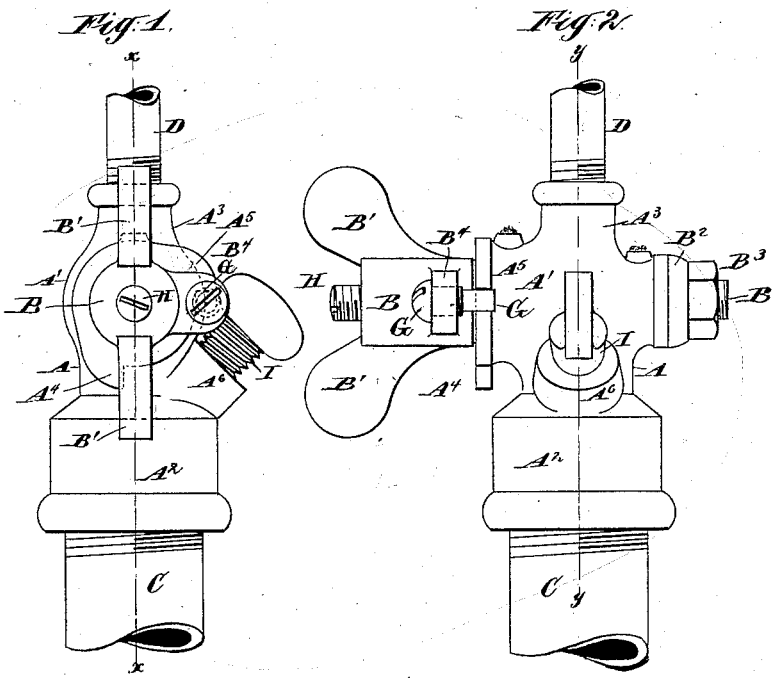
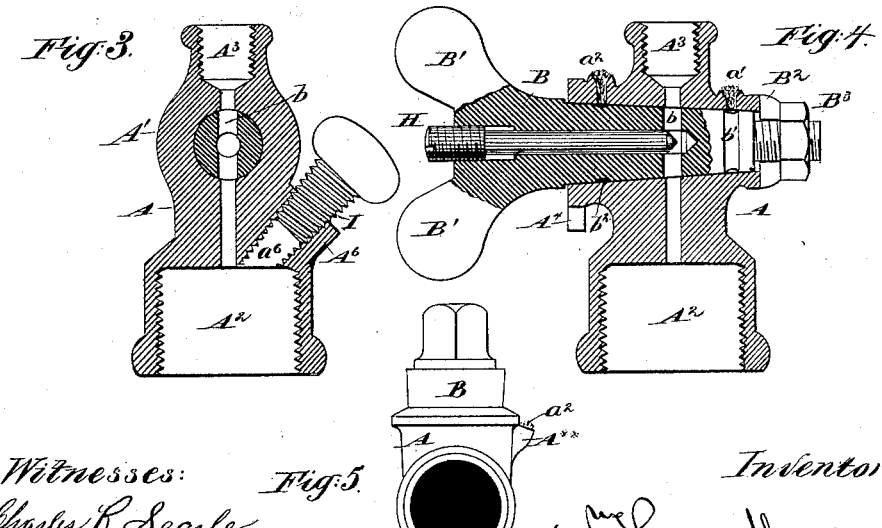
Witnesses:
Charles R. Searle,
Florence A. Richmond,
Inventor:
Thomas Maguire,
by his attorney
Thomas Drew Stetson.

UNITED STATES PATENT OFFICE.

THOMAS MAGUIRE, OF PORT JERVIS, NEW YORK.

GAS-COCK.

SPECIFICATION forming part of Letters Patent No. 385,719, dated July 10, 1888.

Application filed September 8, 1886. Serial No. 213,015. (No model.)

*To all whom it may concern:*

Be it known that I, THOMAS MAGUIRE, of Port Jervis, Orange county, in the State of New York, have invented a certain new and useful Improvement in Gas-Cocks, of which the following is a specification.

It has long been common to provide such cocks used for controlling the flow of gas to one or more burners with a stop, which as the plug of the cock is turned shall prevent it from being turned too far in the direction either to open or shut. The ordinary stop formed by a pin projecting from the plug and playing in a notch in the casing does not give sufficient leverage, and is for other reasons objectionable. I provide an arm on the plug reaching out a sufficient distance, and mount on this arm a stop in the form of a screw. I provide sufficient projections on the casing adapted to be struck by this screw. The screw is preferably formed with a plain portion to strike the projections, thus avoiding any liability to bruise the screw-thread.

I provide my improved cock with facilities for introducing lubricating material, facilities for introducing thawing material in case of frost, and with a device for exactly regulating the area of the passage. The stop allows the cock to be turned into the full open condition. The additional device for regulating is independently adjustable and controls the amount of opening with unusual nicety.

The following is a description of what I consider the best means of carrying out the invention.

Figure 1 is an elevation showing the cock in use on an upright pipe. Fig. 2 is an elevation at right angles to Fig. 1. Fig. 3 is a vertical section on $y\ y$, Fig. 2; and Fig. 4 is a vertical section on $x\ x$, Fig. 1. Fig. 5 is an elevation showing the cock applied to a horizontal pipe with the plug upright. The provisions for lubricating are modified to adapt it for this position.

Similar letters of reference indicate corresponding parts in all the figures where they occur.

A is the body, or what I term the "casing" of the cock. It may be cast-brass. Certain portions will be designated when necessary by additional marks, as $A'\ A^2$, &c. The central main portion, nicely bored to receive the plug, is marked $A'$. The receiving-nozzle is marked $A^2$. It is screw-threaded and makes a tight joint with the pipe C, through which the gas is received. The delivering-nozzle is marked $A^3$. It is screw-threaded and makes a tight joint with the delivering-pipe D.

B is the plug. It is provided, as usual, with efficient turning means, as the thumb-piece $B'$, and with efficient holding means, as the washer and nut $B^2\ B^3$. It is also provided with a rigid arm, $B^4$. In this is tapped a stop, G, which may be like an ordinary machine-screw, operated by a screw-driver, but is preferably formed as shown, a considerable portion near the point plain or without screw-threads. The body is formed with a projection, $A^4$, which, being struck by the screw-stop G, arrests the plug in the closed condition. The body is also provided with a projection, $A^5$, which correspondingly arrests the plug in the open position.

The ordinary orifice, through which the gas flows diametrically across the body of the plug, is marked $b$. A hole is bored from the head of the plug in the line of the axis and connects with this aperture $b$. It is screw-threaded near the outer end and is tapered near its inner end. H is a correspondingly-formed regulator inserted in this axial passage. Its duty is to regulate the area of the passage for the gas.

A shallow groove is turned or otherwise produced around the plug near the small end, as indicated by $b'$. A corresponding groove is turned around the plug near its large end, as indicated by $b^2$. Bosses are formed in corresponding positions in the body A. Through these bosses oil-holes $a'\ a^2$ are bored, communicating with the corresponding grooves. When the cock is in use, these holes are loosely filled with cotton, asbestus, or other absorbent material. A drop of oil applied at intervals is retained in the interstices in this fibrous matter, and supplies it as required to the corresponding grooves, and thence to the adjacent rubbing-surfaces between the plug B and the casing A.

I consider the grooves $b'\ b^2$ essential when used on a plug provided with a stop, as G, for the reason that said plug, making never more than a quarter-revolution, would not distribute the lubricant thoroughly over its entire surface. In this case said lubricant is free to flow in the grooves entirely around the plug, whence it is drawn laterally to either side of said grooves between the rubbing-surfaces. This feature of the invention is particularly important with water-gas. The latter has the property of absorbing or destroying all the lubricating material with which it comes in contact. My loosely-filled oil holes and grooves, arranged as shown, insure lubrication and tightness at each end, however dry the mid-length of the plug may run.

The aqueous particles in the gas are liable to freeze in cold weather and to stop the pipe or to greatly retard the flow of the gas. I provide for introducing alcohol to effect the thawing through a passage separately provided and separately secured.

I provide an additional boss, $A^6$, in which is produced an inclined aperture, $a^6$, adjacent to the cock, but a little below it, the aperture communicating with the interior of the gas-passage. I tap the mouth of the aperture to receive a tapering screw-threaded plug, I. This plug, operated by a thumb-piece, as shown, or by a screw-driver or suitable wrench, should be screwed down, so as to be absolutely tight under all ordinary conditions. When in severe weather the force of the gas slackens, or there are any other indications of freezing, the gas may be cut off at the meter, or at some other convenient point near the main, and the screw-plug I is easily removed and again refitted. Alcohol is inserted through this aperture during the interim. No novelty is claimed for this feature or for the regulating-plug H.

The removable quality of the stop G is important, not only in allowing it to be exchanged and renewed, if occasion should require, but it serves an important end in allowing the cock to be finished with the perfect fit required on the tapering part quite up to the base of the arm $B^4$. A permanent stop would interfere seriously with the ease and perfection of effecting such finish.

Modifications may be made in the forms and proportions. The nozzles $A^2$ $A^3$ may be of equal size, or there may be a greater difference than shown.

For a cock intended for use with the plug in an upright position, the oil-holes $a'$ $a^2$ should be inclined and the bosses $A^*$ $A^{**}$ correspondingly formed. Such a modification is shown in Fig. 5.

Although I have described the invention as a gas-cock, and have designed it more especially for illuminating and heating purposes, it may serve for other gases or liquids. Some of the features, as the parts $B^4$ G $A^4$ $A^5$, will be of advantage when the cock is applied for a great variety of uses.

I attach importance to the fact that the oil-holes $a'$ $a^2$ supply the oil to the surface of the plug, so as to lubricate a belt extending around the plug each side of the gas-passage. The shallow grooves $b'$ $b^2$ are merely aids to promote the flow of the oil quite around this belt.

I claim as my invention—

1. The plug B, having the plug-arm $B^4$, carrying a removable screw, G, in combination therewith, and with a cock body or case, A, having projections $A^4$ $A^5$, arranged to serve as herein specified.

2. The cock-body A, having projections $A^4$ $A^5$, in combination with the plug B, having the internally-screw-threaded plug-arm $B^4$, and the screw G, carried by said plug-arm, the projecting portion of said screw which engages said projections $A^4$ $A^5$ being smaller than the threaded portion of said plug-arm and plain, as and for the purpose specified.

3. In a gas-cock, the cock-body A, having projections $A^4$ $A^5$, and provided with a longitudinal gas passage, a tapering lateral aperture, and oil-ducts $a'$ $a^2$, opening into said lateral passage on either side of said gas-passage, in combination with a tapering plug, B, fitting said aperture in the body and having a lateral gas-passage adapted to register with the gas-passage in said body, and annular grooves $b'$ $b^2$, registering with said oil-ducts in the body, the washer $B^2$ and nut $B^3$ on said plug, and a plug-arm on said plug adapted to strike said projections $A^4$ $A^5$, as and for the purpose herein specified.

In testimony whereof I have hereunto set my hand, at Port Jervis, New York, this 6th day of September, 1886, in the presence of two subscribing witnesses.

THOMAS MAGUIRE.

Witnesses:
 W. E. SCOTT,
 L. E. GOLDSMITH.